United States Patent
Kanno et al.

(10) Patent No.: US 7,580,885 B2
(45) Date of Patent: Aug. 25, 2009

(54) ELECTRONIC MONEY SETTLEMENT METHOD USING MOBILE COMMUNICATION TERMINAL

(75) Inventors: Hiroshi Kanno, Kawasaki (JP); Kenji Satoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1164 days.

(21) Appl. No.: 10/660,872

(22) Filed: Sep. 11, 2003

(65) Prior Publication Data

US 2004/0049454 A1    Mar. 11, 2004

Related U.S. Application Data

(63) Continuation of application No. PCT/JP01/01964, filed on Mar. 13, 2001.

(51) Int. Cl.
*G06Q 40/00* (2006.01)

(52) U.S. Cl. .............. 705/39; 705/26; 705/21

(58) Field of Classification Search ............ 705/39, 705/21, 26; 235/380
See application file for complete search history.

(56) References Cited

U.S. PATENT DOCUMENTS

| | | | |
|---|---|---|---|
| 6,332,133 | B1 | 12/2001 | Takayama |
| 7,072,854 | B2 * | 7/2006 | Loeser ............... 705/21 |
| 7,273,168 | B2 * | 9/2007 | Linlor ............... 235/380 |
| 2002/0025796 | A1 * | 2/2002 | Taylor et al. ............... 455/406 |
| 2003/0055792 | A1 * | 3/2003 | Kinoshita et al. ............ 705/67 |
| 2003/0078844 | A1 * | 4/2003 | Takatori et al. ............ 705/17 |
| 2004/0059671 | A1 * | 3/2004 | Nozaki et al. ............... 705/39 |

FOREIGN PATENT DOCUMENTS

| | | |
|---|---|---|
| JP | 7-160791 | 6/1995 |
| JP | 10-91866 | 4/1998 |
| JP | 10-198739 | 7/1998 |
| JP | 10-210525 | 8/1998 |
| JP | 11-184947 | 7/1999 |
| JP | 2000-59522 | 2/2000 |
| JP | 2000-242696 | 9/2000 |
| JP | 2001-134684 | 5/2001 |
| WO | WO 98/34203 | 8/1998 |
| WO | WO 00/02150 | 1/2000 |

OTHER PUBLICATIONS

Japanese Office Action dated Feb. 6, 2007.
European Search Report dated May 10, 2006.

* cited by examiner

*Primary Examiner*—Jagdish N Patel
(74) *Attorney, Agent, or Firm*—Katten Muchin Rosenman LLP

(57) ABSTRACT

A settlement system includes a mobile communication terminal, an input device, and a settlement device. The input device transmits data of a charge to the mobile communication terminal and transmits the data of the charge to the settlement device. The settlement device transfers an amount of money from a first account to a second account and transmits report data of the amount of transferred money to the mobile communication terminal. The mobile communication terminal includes a first reception unit to receive the data of the charge, a second reception unit to receive the report data of the amount of transferred money, a display to display the data of the charge and the report data of the amount of transferred money, and a memory able to store the data of the charge at least until the report data is received by the second reception unit.

4 Claims, 5 Drawing Sheets

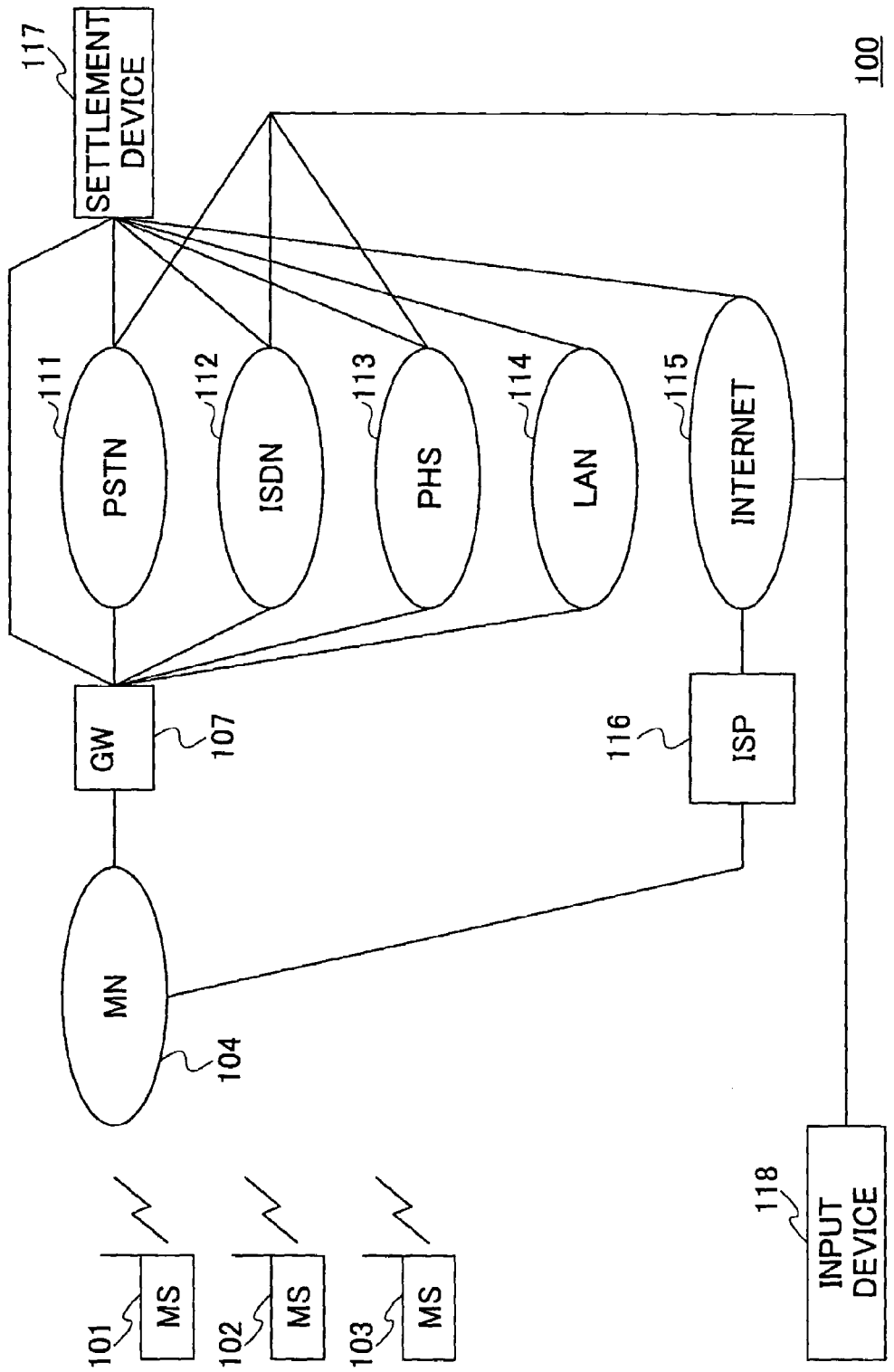

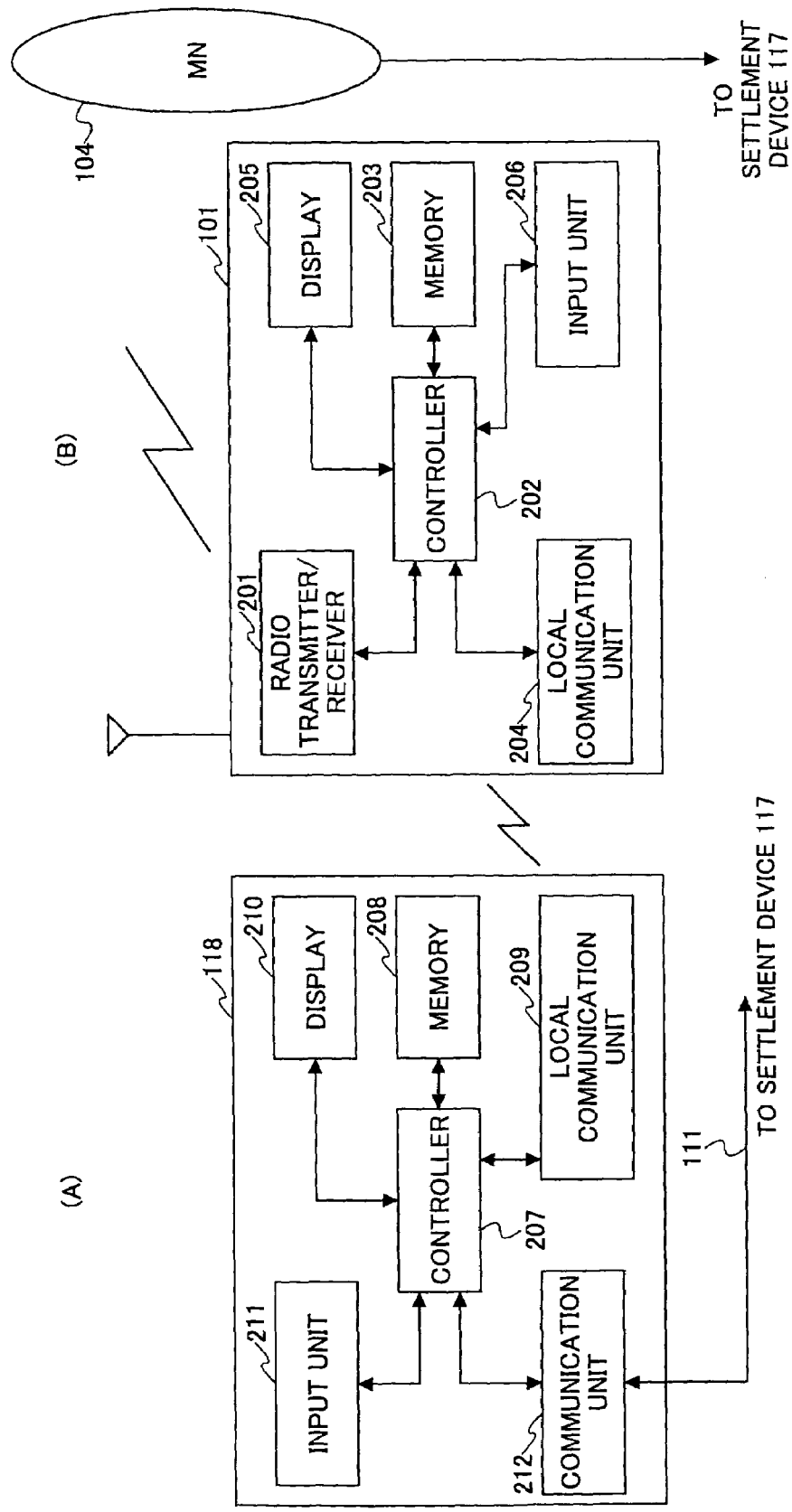

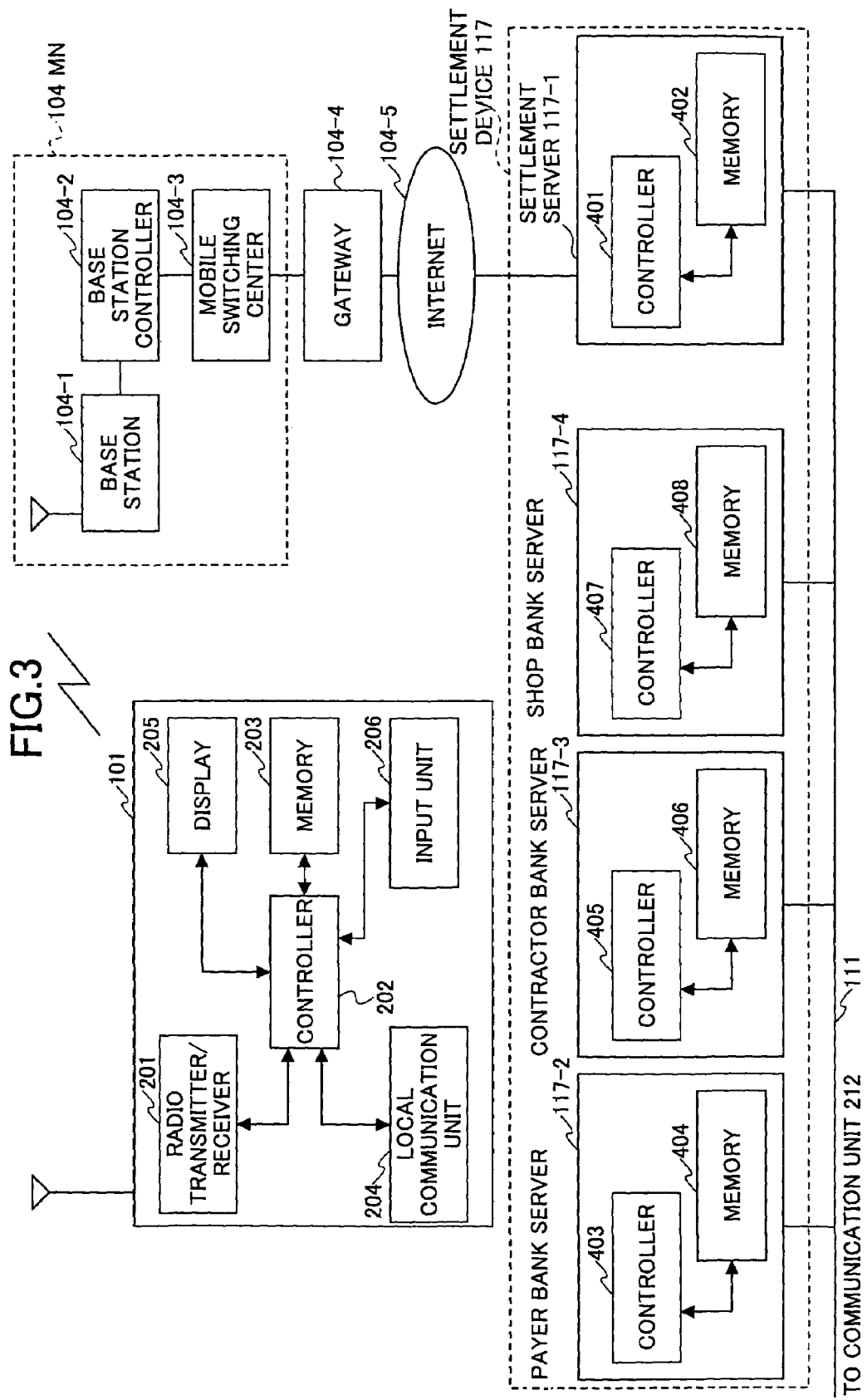

FIG.4

| ITEMS ON SALE | | |
|---|---|---|
| ID | NAME | PRICE |
| 0001 | CLOTHES | ¥1000 |
| 0002 | CONFECTIONERY | ¥500 |
| 0003 | ... | ... |
| ... | ... | ... |

| ITEMS PURCHASED | | |
|---|---|---|
| ITEM ID | NAME | PRICE |
| 0001 | CLOTHES | ¥1000 |
| 0002 | CONFECTIONERY | ¥500 |
| CHARGE | ¥1575 | |
| TRANSACTION ID | 003 | |
| TIME OF CONFIRMATION OF PAYMENT ACKNOWLEDGMENT | 10:00 | |
| MOBILE TERMINAL ID | XXXXXX1 | |
| SECRET DATA | ABCDEFG | |

FIG.5

| MOBILE TERMINAL ID | XXXXXX1 |
|---|---|
| SECRET DATA | ABCDEFG |

| ITEMS PURCHASED | | |
|---|---|---|
| ITEM ID | NAME | PRICE |
| 0001 | CLOTHES | ¥1000 |
| 0002 | CONFECTIONERY | ¥500 |
| CHARGE | ¥1575 | |
| TRANSACTION ID | 003 | |
| TIME OF PAYMENT ACKNOWLEDGMENT | 10:00 | |
| CASH REGISTER ID | P | |
| TIME OF PAYMENT REPORT RECEPTION | 12:00 | |
| TIME OF PAYMENT REPORT ACKNOWLEDGMENT | 12:30 | |

FIG.6

| TERMINAL ID (SECRET DATA) | TRANSACTION ID | SHOP ID | ITEMS PURCHASED | RECEPTION TIME | PAYMENT COMPLETION FLAG | PAYMENT ACKNOWLEDGMENT FLAG |
|---|---|---|---|---|---|---|
| XXXXX1 (ABCDEFG) | 001 | A | XXXXXX | 11:10 | 1 | 1 |
| | 002 | B | YYYYY | 12:30 | 1 | 1 |
| XXXXX2 | 001 | F | RRRRRR | 9:17 | 1 | 0 |
| | 002 | F | GGGGGG | 17:36 | 0 | 0 |
| ... | ... | ... | ... | ... | ... | ... |
| XXXXXN | 001 | E | QQQQQQ | 14:00 | 0 | 0 |

ELECTRONIC MONEY SETTLEMENT METHOD USING MOBILE COMMUNICATION TERMINAL

CROSS-REFERENCE TO RELATED APPLICATION

The present application is a continuation of International Application No. PCT/JP01/01964 which was filed on Mar. 13, 2001.

TECHNICAL FIELD

The present invention relates to an electronic money settlement method, particularly, to an electronic money settlement method using a mobile communication terminal.

BACKGROUND OF THE INVENTION

Credit cards, debit cards, and smart cards, which are forms of the so-called "electronic money", are attracting attention because they eliminate the necessity of carrying or making change, and make payment of a small amount of money easy and fast. Furthermore, it is expected that usage of electronic money will be realized in the future in convenience stores, shops at railway stations, public transport, vending machines, and so on.

Among the forms of electronic money, there is also the so-called prepaid electronic money card, which includes a disposable type and a re-loadable type. Each disposable type prepaid electronic money card, the same as the usual prepaid cards, is equivalent to a specified amount of money, and can be purchased from banks or other financial institutions. On the other hand, the re-loadable type prepaid electronic money cards do not have any money deposited when they are purchased; when it is desired to use the card, an amount of money may be loaded into such a card with an exclusive reload terminal or an ATM (Automated Teller Machine). Furthermore, the card may be reloaded many times.

It is technically possible to include in a single card the above functions of a credit card, a cash card, a debit card, and a re-loadable prepaid card.

Recently and continuing, the settlement methods related to the credit card, debit card, smart card, and others are frequently used. Especially, the settlement method involving the credit card has been well established, in which a payment is made on the basis of a specific card number and a specific signature for a credit card. However, problems have occurred recently in that money is withdrawn even without signatures, implying that problems exist in the security of the user authentication system.

As for debit cards, if a user inputs a specified number of the debit card and a password dedicated to the card, it is possible for the user to make payment from his bank account immediately. However, in the user authentication system related to debit cards, only a card number recorded in the debit card (a magnetic card) and the password remembered by the user are used for user authentication, and therefore the security level of the debit card user authentication system is not sufficiently high. For this reason, in order for the user to monitor illegal settlements, he has to keep all receipts of previous transactions, and each time he withdraws money from his bank account, he has to compare the new receipts with the old ones to make sure there have not been illegal settlements.

In case of the smart card, there are two kinds of methods of using it. In one method, user authentication is not performed at all, and in the other method, it is required to input a PIN code to perform user authentication. Because the smart card is furnished with functions of user authentication, encoded communication, and digital signature, it has a relatively high security level. The basic technique employed in the smart card is similar to that employed in the USIM (Universal Subscriber Identity Module), which is connected to the recently established public mobile communication network. The USIM is a card having an electronic interface, whose shape is designated to be the same as the UICC (UMTS Integrated Circuit Card), and in compliance with ISO 7816-1 and ISO 7816-2. The integrated circuit of a smart card includes a ROM (Read-Only Memory), RAM (Random Access Memory), EEPROM (Electrically Erasable and Programmable ROM), a CPU (Central Processing Unit), and a security logic circuit, and stores an ID number, an authentication key, an encryption key, and other information. When user authentication is performed by inputting the PIN code, however, because the authentication system uses the PIN code only, just as with the debit card mentioned above, the user has to monitor illegal settlements by himself. Therefore, in order to make payment with smart cards, it is required to further improve their security level, and ease of use as well.

Summarizing the problems of the electronic money settlement methods of the related art described above, a user of an electronic money card of the related art cannot determine, in near-real time and from his mobile terminal at any desired time and any desired place, whether his payment is made safely for the goods he ordered or the service he requested. In addition, even if the user's personal data are misused, it is difficult to determine the misuse. On the other hand, in the related art, it is difficult to safely perform user authentication in a short time interval at shops, and thus it is difficult to safely charge at shops in a short time interval.

DISCLOSURE OF THE INVENTION

Accordingly, it is an object of the present invention to provide an electronic money settlement method using a mobile communication terminal to solve the above problems.

In the settlement system of the present invention, comprising a mobile communication terminal, a settlement input device, and a settlement device, data of purchased items and code of a purchaser are input to the settlement input device, for example, a cash register, and the settlement input device transmits the purchased items data and the purchaser code to the mobile communication terminal, for example, a cellular phone. Next, in the mobile communication terminal, authentications of the purchased items data and the purchaser code are performed, and the result of the authentication is sent back to the settlement input device. In the settlement input device, based on the authentication result, a transfer request list is created, and is transmitted to the settlement device, for example, a settlement server.

Further, in the mobile communication terminal, based on the authentication result, a payment list is created, and is transmitted to the settlement server. In the settlement server, the transfer request list and the payment list are stored, and are compared to each other, and when they are in agreement, the settlement server makes a payment.

Further, after comparing the transfer request list and the payment list, the settlement server transmits the comparison result to the mobile communication terminal.

Furthermore, when making authentications of the purchased items data and the purchaser code received from the settlement input device in the mobile communication terminal, the mobile communication terminal generates a unique number for each transaction, and using this number, the mobile communication terminal creates the payment list, and the settlement input device creates the transfer request list.

Consequently, it is possible for a purchaser to determine, from his mobile terminal at any desired time and any desired place and in near-real time, whether the payment is made safely for the exact goods he ordered or the exact service he requested. In addition, when the purchaser's data are misused, it is possible to detect the misuse.

On the other hand, at shops, authentication of the purchaser can be made safely in a short time interval, thus enabling safe charging at shops in short time intervals.

BRIEF DESCRIPTION OF THE DRAWINGS

FIG. 1 is a view of an overall configuration of a settlement system according to an embodiment of the present invention;

FIG. 2 shows block diagrams for explaining configurations of the mobile communication terminal 101 and the settlement input device 118 shown in FIG. 1;

FIG. 3 is a block diagram showing configurations of the mobile communication terminal 101, the mobile communication network 104, and the settlement device 117 shown in FIG. 1;

FIG. 4 is a table showing an example of data stored in the memory 208;

FIG. 5 is a table showing an example of data stored in the memory 203; and

FIG. 6 is a table showing an example of data stored in the memory 402.

BEST MODE FOR CARRYING OUT THE INVENTION

First Embodiment

[1. The Overall Configuration]

FIG. 1 is a view of an overall configuration of a settlement system according to an embodiment of the present invention.

In FIG. 1, there are shown a settlement system 100 including mobile communication terminals (denoted as "MS") 101 through 103, a mobile communication network (denoted as "MN") 104, a gateway 107, an Internet service provider (ISP) 116, a settlement device 117, a settlement input device 118, and a PSTN (Public Switched Telephone Network) 111, an ISDN (Integrated Services Digital Network) 112, a PHS (Personal Handyphone System) mobile network 113 or other mobile networks, a LAN (Local Area Network) 114, and the Internet 115.

The mobile communication terminals 101 through 103 can be connected to the mobile communication network 104 through a radio link, and through the gateway 107 the mobile communication network 104 is connected to the PSTN 111, ISDN 112, PHS 113, LAN 114, the Internet 115, ISP 116, and the settlement device 117.

A request for payment is input from the settlement input device 118, and the settlement device 117 is requested to process the payment.

Here, the mobile communication terminals 101 through 103 are able to communicate with the settlement input device 118 via a radio link or through cables, and the settlement input device 118 is also able to communicate with the settlement device 117 via a radio link or through cables.

The settlement system of the present invention may also have other configurations different from that shown in the above example, as long as mobile communication terminals 101 through 103 are able to communicate with the settlement device 117 via the mobile communication network 104, and the settlement input device 118 is able to communicate with the settlement device 117.

[2. Configurations of Settlement Input Device and Mobile Communication Terminal]

FIG. 2 presents block diagrams showing configurations of the mobile communication terminals and the settlement input device 118 shown in FIG. 1, where FIG. 2B shows the detailed configuration that is for each of the mobile communication terminals, for example, the mobile communication terminal 101 shown in FIG. 1, and FIG. 2A shows the detailed configuration of the settlement input device 118.

Here, a cellular phone is taken as an example of the mobile communication terminal 101, and a cash register is taken as an example of the settlement input device 118.

<2.1 Cellular Phone 101>

In FIG. 2B, the cellular phone 101 includes a radio transmitter/receiver 201, a controller 202, a memory 203, a local communication unit 204, a display 205, and an input unit 206.

The radio transmitter/receiver 201 has an antenna, and is able to communicate with the mobile communication network 104 via a radio link. Specifically, the radio transmitter/receiver 201 is able to transmit radio signals to or receives radio signals from a base station installed within the mobile communication network 104. The radio signals transmitted from the cellular phone 101, for example, radio signals including voice, images, and text are received at the base station, and the base station transmits the received signals to other cellular phones connected to the mobile communication network 104. In addition, radio signals transmitted from other cellular phones, for example, radio signals including voice, images, and text, are received at the base station; the base station transmits the radio signals to the cellular phone 101, and the radio transmitter/receiver 201 receives and demodulates the radio signals, and sends the demodulated signals to the controller 202.

In addition, the local communication unit 204 is able to communicate with the cash register 118 via a radio link or cables. Specifically, the local communication unit 204 is able to communicate with the cash register 118 locally and directly, without going through the mobile communication network 104 and the base station. When the local communication unit 204 communicates with the cash register 118 via cables, interfaces are attached to the cash register 118 and the cellular phone 101 to connect cables or connectors.

The Blue Tooth technique may be applied to the local communication unit 204. The local communication unit 204 may be configured to support the frequency range in which the radio transmitter/receiver 201 transmits signals to or receives signals from the cash register 118, and may further be formed integrally with the radio transmitter/receiver 201.

The memory 203 is a storage medium for storing, for example, programs used by the controller 202 for control operations, data received from the cash register 118 and the mobile communication network 104, and identification data (Note: I've interchanged "data" and "information" throughout the Description to match their respective uses in the claims.) of the cellular phone 101, for example, the telephone number or terminal number of the cellular phone 101, for distinguishing the cellular phone 101 from other cellular phones. For example, the UICC (UMTS, IC card) may be used as the memory 203, and it can be configured so that the memory 203 is attachable to or detachable from the cellular phone 101.

The controller 202 is adapted to control operations of the radio transmitter/receiver 201, the local communication unit 204, and the display 205. For the control, the controller 202 reads system programs created to perform the above control from the memory 203 and executes the programs.

The display 205, for example, displays the information received from the mobile communication network 104 and the cash register 118 while being controlled by the controller 202, and is comprised of a liquid crystal display, for example.

The input unit 206 is a device with which a user of the cellular phone 101 inputs figures and instructions, and includes dial buttons for inputting dial figures for calling, and a decision button. The controller 202 detects the operations of buttons of the input unit 206.

<2.2 Cash Register 118>

In FIG. 2A, the cash register 118 includes a controller 207, a memory 208, a local communication unit 209, a display 210, an input unit 211, and a communication unit 212.

The controller 207 is adapted to control operations of the local communication unit 209, the display 210, and the communication unit 212, and at the same time, based on the information of the purchased goods input from the input unit 211 and by comparison with the data stored in the memory 208, the controller 207 calculates the sum of prices of all the purchased goods and displays the results on the display 210. The information of the purchased goods, for example, includes identification information of the goods that the purchaser desires to buy, which is obtainable from the identification information of the goods on sale.

The memory 208 stores the identification information of the goods on sale at the shop where the cash register 118 is installed. The identification information of the goods on sale, for example, includes at least prices of the goods, and preferably, names of the goods. In addition, the memory 208 also stores the information received from the settlement device 117 and the cellular phone 101.

The local communication unit 209 corresponds to the local communication unit 204 of the cellular phone 101, and is able to communicate with the local communication unit 204 locally via cables or a radio link.

While being controlled by the controller 207, the display 210 displays the information of the purchased goods input from the input unit 211, that is, the identification information of the goods on sale, the sum of prices of all the purchased goods calculated by the controller 207, and the identification data of the cellular phone 101.

The input unit 211 is a device for inputting the information of the purchased goods (identification information of the goods on sale), and the identification data of the cellular phone 101. The input unit 211 may include a key board, and the store clerk and the owner of the cellular phone 101 may operate the input unit 211.

The communication unit 212 is able to communicate with the settlement device 117 through cables, for example, the PSTN 111.

[3. Purchase Procedure]

<3.1 Creation of List of Purchased Items>

The user of the cellular phone 101 selects goods that he desires to purchase at a shop where the cash register 118 is installed, and carries the goods to the cash register 118. Alternatively, the user of the cellular phone 101 may specify the desired goods, and inform the store clerk that he desires to buy the goods.

Upon that, the store clerk inputs to the cash register 118 the information of the goods desired by the user, which is obtainable from the identification information of the goods on sale. Alternatively, the store clerk may use a bar code reader to read the bar code printed on each of the goods, and the bar code data are sent to the controller 207. In this case, the bar code data may include the identification information of the goods on sale, and the bar code reader corresponds to the input unit 211.

Next, the controller 207 reads the price data corresponding to the information of the purchased goods input from the input unit 211 (the identification information of the goods on sale) from the memory 208, and calculates the sum of prices of the purchased goods.

Below, an explanation is made of the data stored in the memory 208. FIG. 4 shows an example of a part of data stored in the memory 208.

The upper part of FIG. 4 shows a list of items on sale, including the identification information, name, and price for each item. Preferably, other information such as color may also be included in the list. For example, in FIG. 4, corresponding to the item having identification information 0001, a name "clothes", and a price "1000 Yen" are stored. Note that it is not necessary for the cash register 118 to have the memory 208. For example, a configuration may be made in which the above information of the items on sale is included in a data base, and the data base may be provided at any place as long as the cash register 118 can access the data base, and read out information of items to be purchased.

The controller 207 of the cash register 118 reads out the prices corresponding to the information of the items to be purchased, which is input from the input unit 211. For example, the identification information items 0001 and 0002 are input as the data of the items to be purchased, and the prices 1000 Yen and 500 Yen corresponding to the identification information items 0001 and 0002 are read out by the controller 207. Then, the controller 207 calculates the sum (1500 Yen) of the prices of the two items, and further multiplies the sum by 1.05 to include the consumption tax. Therefore, the charge that the purchaser is requested to pay is 1575 Yen, and this value is displayed on the display 210. Preferably, the name of the purchased item is also displayed. Then, the controller 207 stores the information of the purchased item in the memory 208.

Below, an explanation is made of the data of the purchased items stored by the controller 207 in the memory 208.

The lower part of FIG. 4 shows a list of purchased items. Although FIG. 4 shows only one list of purchased items, lists of purchased items of other purchasers may also be stored in the memory 208, and it is desirable to preserve a region in the memory 208 for this purpose.

As illustrated in the lower part of FIG. 4, data of the purchased items include the identification information of the purchased items (0001 and 0002), which is obtained from the identification information of items on sale input to the cash register 118. Preferably, the name (clothes and confectionery), price (1000 Yen and 500 Yen) and the charge (1575 Yen) of each item are also stored in the memory 208.

<3.2 Local Path Formation>

Next, the user of the cellular phone 101, who confirms the information displayed on the display 210, informs the store clerk of the identification data of the cellular phone 101, and the store clerk operates the input unit 211 of the cash register 118, and inputs the identification data of the cellular phone 101. Alternatively, the user may operate the input unit 211 of the cash register 118 by himself to input the identification data of the cellular phone 101. Note that if it is specified in advance to omit displaying the data, the user informs the store clerk of the identification data of the cellular phone 101 without confirming the display. When the identification data of the cellular phone 101 are input, the controller 207 stores the identification data in the memory 208 as an element of the list of the purchased items.

The cash register 118 uses the identification data of the cellular phone 101 to designate the cellular phone to be a target of a communication made through the local communication unit 209. This is particularly useful when the Blue-Tooth technique is employed. Specifically, in that case, the local communication unit 209 transmits the identification data of the cellular phone 101 by radio signals. A cellular phone, for example, the cellular phone 101, which is adapted to receive the radio signals, receives the radio signals by using its local communication unit 204, and compares the received identification data with its own identification data stored in the memory 203. When they are in agreement, the cellular phone 101 starts transmission and reception of radio signals with the cash register 118; when they are not in agreement, the cellular phone 101 does not perform the subsequent authentication and other processing between itself and the cash register 118 even when the cellular phone 101 receives the radio signals.

Below, an explanation is made of the data stored in the memory 203 of the cellular phone 101. FIG. 5 shows an example of a part of the data stored in the memory 203. In FIG. 5, the identification data of the cellular phone 101 for identifying the cellular phone 101 from among other cellular phones is stored in the memory 203 (here, they are shown to be "XXXXXX1").

The cash register 118 uses this identification data of the cellular phone 101 to designate the cellular phone as a target of communication made through the local communication unit 209. When the local communication unit 204 and the local communication unit 209 communicate with each other by a cable, transmission of the identification data of the cellular phone 101 may be omitted if there is only one target cellular phone that is connected with the cash register 118 and communicates with the cash register 118 by a cable.

As described above, a communication path is formed between the local communication unit 204 and the local communication unit 209. In addition, it is preferable that the communication using this path be encrypted, and the controller 207 and the controller 202 be capable of encryption processing of communication.

<3.3 Authentication>

Next, the user of the cellular phone 101 inputs secret information from the input unit 211. Here, the secret information is data including letters, figures, or their combination, and may be the telephone number, device number, or other identification data of the cellular phone 101. The controller 207 stores the secret information in the memory 208 as an element of the data of the list of the purchased items. In FIG. 5, the secret information is shown to be "ABCDEFG". Further, as shown in FIG. 5, the secret information is stored beforehand in the memory 203 of the cellular phone 101.

The controller 207 detects the operation of inputting the secret information, and performs authentication of the cellular phone 101 by using the communication path formed between the local communication unit 204 and the local communication unit 209.

For example, the controller 207 randomly selects a figure, and directs the local communication unit 209 to transmit the random number to the local communication unit 204 by cables or a radio link. The controller 207 stores the random number in advance in the memory 208 as an element of the data of the list of the purchased items. The cellular phone 101 receives the random number by the local communication unit 204; the controller 202 encrypts the random number using its own secret information stored in the memory 203, and transmits the encrypted number from the local communication unit 204 to the local communication unit 209.

The cash register 118 receives the encrypted random number by the local communication unit 209. Then, the controller 207 encrypts the random number stored in the memory 208 using the secret information stored in the memory 208, and compares the result with the received encrypted random number. If the two numbers are in agreement, the controller 207 concludes the purchaser is the valid user of the cellular phone 101, and enables the subsequent communication with the settlement device 117. If the two numbers are not in agreement, the controller 207 either transmits another random number to the cellular phone 101 to perform the authentication again, or concludes that the purchaser is not the valid user of the cellular phone 101 and the routine is terminated, or transmits information including the identification data or the secret information to a not illustrated security service center connected to the PSTN 111. The security service center further transmits information including the identification data or the secret information to a not shown cellular phone management device in the mobile communication network 104. In the cellular phone management device, the valid phone number of the cellular phone is stored corresponding to the identification data or the secret information, and the telephone number corresponding to the received identification data is displayed. This treatment enables confirmation if the cellular phone 101 of the valid user is misused. Further, it is preferable that a flag be stored in a home location register in a mobile switching center within the mobile communication network 104 to enable suspension of the service for the cellular phone 101, and authentication be rejected at the time of the position registration. Note it is necessary to install the control unit in the mobile switching center for performing the above operation.

<3.4 Transmission of Purchased Items to Cellular Phone 101 and Confirmation of Intent of Purchase>

If the controller 207 of the cash register 118 confirms that the cellular phone 101 is a valid one, the controller 207 transmits the data of the list of purchased items stored in the memory 208 and its own identification data stored separately to the cellular phone 101 through the local communication unit 204 and the local communication unit 209. The identification data of a cash register may be assigned to each cash register, or to each shop where the cash register is installed. Below the identification data of the cash register 118 is represented by P.

The controller 202 of the cellular phone 101, which received the data of the list of the purchase items, displays the list of the purchase items and the identification data P of the cash register 118 on the display 205, which is, for example, a liquid crystal display. If the user of the cellular phone 101 accepts purchase of the items as displayed on the display 205, he operates the input unit 206, for example, by stroking a decision key. Then, the controller 202 of the cellular phone 101 stores the data of the list of purchased items and the identification data P into the memory 203, and transmits an acknowledgement signal to the cash register 118 through the local communication unit 204 and the local communication unit 209. Here, when storing the data of the list of purchased items and the identification data P into the memory 203, it is preferable to store the time of reception of the list of the purchase items, for example, the time when the decision key is stroked, as the time of acknowledgement of settlement.

Further, at this time, the cellular phone 101 generates a transaction identification number for each transaction (in FIG. 5, it is "003") and appends the transaction identification number to the acknowledgement signal, and at the same time, stores the transaction identification number in the memory 203 as an element of the data of the list of the purchased items as shown in FIG. 5.

The transaction identification number, for example, may be any number in the range from 001 to 100, and a different transaction may be assigned a different number in a regular way. For example, for the first transaction made by the cellular phone 101, the transaction identification number may be assigned to be 001, and for the second transaction made by the cellular phone 101, the transaction identification number may be assigned to be 002, and so on. The identification number after 100 may be set back to 001. Certainly, the transaction identification number may also be assigned in any other regular way in addition to the above one. For example, the transaction identification number may be assigned to be even numbers 2, 4, 6, and so on. When two transactions have been performed and the list of the purchased items of the previous two transactions are stored in the memory 203 of the cellular phone 101, since the preceding transaction identification number is stored to be 002, the controller 203 increments the preceding transaction identification number (002) by one, and determines to use the resultant 003 as the present transaction identification number.

The controller 207 of the cash register 118 receives the acknowledgment signal, and stores the transaction identification number (here, it is "003") as an element of the data of the list of the purchased items if the transaction identification number has been received, and starts communication with the settlement device 117. Here, when storing the transaction identification number, it is preferable to store the time of reception of the acknowledgement signal in the list of the purchased items as the time of confirmation of acknowledgement of the settlement. In addition, the time of acknowledgement of the settlement and the time of confirmation of acknowledgement of the settlement may be recorded in terms of date, or in terms of both date and time.

[4. Determination of Purchaser]

The controller 207 of the cash register 118 transmits to the settlement device 117 the identification data P of the cash register 118, the data of the list of the purchased items, and the identification data (or the secret information) of the cellular phone 101 (preferably including the transaction identification data). Using the identification data or the secret information, preferably including the transaction identification data, of the cellular phone 101, the settlement device 117 determines whether the purchaser is valid.

If the purchaser is determined to be valid, the settlement device 117 sends data (validity determination data) to the communication unit 212 of the cash register 118 to provide the determination result. The method of making the determination is described below.

When the cash register 118 receives the validity determination data via the communication unit 212, the controller 207 displays the determination result on the display 210. After the store clerk observes the determination result on the display 210 to make sure purchase procedure including payment has been completed, the user takes the purchased goods and leaves the shop.

The above is a part of the present invention relating to the purchase procedure; below the operations performed by the settlement device 117 and the cellular phone 101 are mainly described. Further, more descriptions are made about purchaser validity determination with reference to FIG. 3.

[5. Settlement]

FIG. 3 is a block diagram showing detailed configurations of the cellular phone 101, the mobile communication network 104, and the settlement device 117. In FIG. 3, the same numeral references are used for the same components as those in FIG. 1 and FIG. 2.

As illustrated in FIG. 3, the mobile communication network 104 includes a base station 104-1 for communicating with the cellular phone 101 via a radio link, a base station controller 104-2 for controlling the base station 104-1 or other base stations, a mobile switching center 104-3 for performing switching control within the mobile communication network 104, and a gateway 104-4 provided between the Internet 104-5 and the mobile communication network 104.

The settlement device 117 includes a settlement server 117-1, a payer bank server 117-2, a contractor bank server 117-3, and a shop bank server 117-4, and these servers include a controller 401 and a memory 402, a controller 403 and a memory 404, a controller 405 and a memory 406, and a controller 407 and a memory 408, respectively. In addition, although not illustrated in FIG. 3, each of the servers 117-1 through 117-4 also has a transmission and reception unit for communication with other servers, and is controlled by the corresponding controller among the controllers 401, 403, 405, and 407.

<5.1 Method of Purchaser Determination>

When determining the validity of a purchaser, the settlement device 117 receives from the cash register 118 the identification data P of the shop, the data of the list of the purchased items, and the identification data or the secret information of the cellular phone 101, preferably including the transaction identification data (here, they are 003). It is noted that the identification data or the secret information of the cellular phone 101 is stored beforehand in the memory 402 of the settlement server 117-1.

Below, an explanation is made of the data stored in the memory 402 of the settlement server 117-1. FIG. 6 shows an example of a part of data stored in the memory 402. As illustrated in FIG. 6, in the memory 402, the identification data or the secret information of the cellular phone 101 is stored for identifying the cellular phone as a target of a settlement transaction. Specifically, as shown in FIG. 6, since the cellular phone 101 is the target of the present settlement transaction, the identification data of the cellular phone 101 are "XXXXXX1", or the secret information is "ABCDEFG".

It should be noted that it is not necessary to provide the memory 402 inside the settlement server 1171; the memory 402 may be arranged at any place within the mobile communication network 104 provided that the settlement server 117-1 can access the memory 402 through the mobile communication network 104 to read the data stored there when the settlement server 117-1 is performing determination processing.

Accordingly, when the settlement server 117-1 receives the identification data or the secret information of the cellular phone 101 transmitted from the cash register 118, the controller 401 determines whether the identification data or the secret information of the cellular phone 101 is stored in the memory 402. If the identification data or the secret information of the cellular phone 101 is stored in the memory 402, the controller 401 determines that the purchaser is valid, and as described above, the settlement device 117 sends data (validity determination data) to the communication unit 212 of the cash register 118 to provide the determination result.

On the other hand, if the controller 401 finds that the identification data or the secret information of the cellular phone 101 is not stored in the memory 402, the controller 401 determines that the purchaser is invalid, and accordingly, the settlement device 117 does not send the validity determination data to the communication unit 212 of the cash register 118; alternatively, the settlement device 117 sends invalidity determination data to the communication unit 212 of the cash register 118 to provide the determination result.

When the controller 207 of the cash register 118 receives the invalidity determination data via the communication unit 212, or does not receive any information from the settlement device 117, the controller 207 displays a message on the display 210 to show that the present cellular phone is not that of the valid user, who acknowledges the settlement.

It should be noted that, if the settlement server 117-1 has received the transaction identification data from the cash register 118, the settlement server 117-1 may use the transaction identification data for the determination instead of the identification data or the secret information of the cellular phone 101. Specifically, each time a purchase transaction is completed, the controller 401 of the settlement server 117-1 stores the received transaction identification data, which is used in the transaction, in the memory 402. Further, the controller 401 determines whether the preceding transaction identification data and the present transaction identification data, both of which are stored in the memory 402, satisfy the rule described above (one-increment rule). If the rule is satisfied, meaning that the cellular phone 101 is valid, the settlement device 117 sends the validity determination data to the communication unit 212 of the cash register 118 to provide the determination result. If the rule is not satisfied, meaning that the cellular phone is invalid, the settlement device 117 sends the invalidity determination data to the communication unit 212 of the cash register 118 to provide the determination result.

Here, since the received identification data of the cellular phone 101 are "XXXXXX1", the controller 401 reads out the transaction identification data corresponding to the identification data "XXXXXX1" of the cellular phone 101 stored in the memory 402. Further, the preceding transaction identification number is 002, and the controller 401 also reads out this number. On the other hand, the presently received transaction identification number is 003, that is, the preceding transaction identification number and the present transaction identification number satisfy the one-increment rule, therefore, the controller 401 determines that the cellular phone 101 is valid.

If the cellular phone 101 is illegally duplicated, because the preceding transaction identification number is not stored in the memory 203 in the illegal cellular phone 101, for example, the transaction identification number "001" is transmitted. In this case, because the preceding transaction identification number of 002 is stored in the memory 402 of the settlement server 117-1, and thus the presently received transaction identification number (001) is less than the preceding transaction identification number (002) by one, the controller 401 of the settlement server 117-1 determines that the change of the transaction identification data does not satisfy the specified rule, and the cellular phone concerned is not the valid cellular phone 101, which is the valid target of the settlement transaction.

In this way, information of the previous transactions is stored in both the cellular phone 101 and the settlement server 117-1, and this enables higher authentication security of cellular phones.

Moreover, for the determination, additional conditions may be used together with the single condition described above, for example, whether the balance of a bank account of the user of the cellular phone 101 corresponding to the received identification information is less than the requested amount of money.

<5.2 Settlement>

As described above, the controller 401 of the settlement server 117-1 determines whether the cellular phone 101 is the valid target of the settlement transaction, and when the controller 401 determines the cellular phone 101 is the target cellular phone with which the settlement transaction is acknowledged, in correspondence with the identification data of the cellular phone 101 (here, they are XXXXXX1), the controller 401 stores the transaction identification information (here, it is 003), the identification data P of the cash register 118, the received data of the list of the purchased goods (simply described as XXXXXX in FIG. 6, but the same as that shown in FIG. 4 and FIG. 5), and the time of reception of the data of the purchased goods list into the memory 402.

Then, the controller 401 of the settlement server 117-1 controls a not-illustrated transmitter to transmit to the contractor bank server 117-3 a settlement request signal including the identification data of the cellular phone 101, the identification data P of the cash register 118, and the requested charge in the data of the purchased goods list. The contractor bank server 117-3 receives the settlement request signal, and the controller 405 of the contractor bank server 117-3 extracts the identification data of the cellular phone 101, the identification data P of the cash register 118, and the requested charge included in the settlement request signal. Further, the controller 405 transfers an amount of money equaling the requested charge (or that after subtracting the fee for service) from a deposit account (the first account), information of which is stored in the memory 406 corresponding to the identification data of the cellular phone 101, of the user of the cellular phone 101, to a deposit account (the second account) of the shop corresponding to the identification data of the cash register 118.

For the above process, the controller 405 reads out the correspondence relation between the identification data of the cash register 118 and the deposit account is stored in the memory 402 of the settlement server 117-1 and the memory 406 of the contractor bank server 117-3. At the same time, the controller 405 may also transfer the fee for service from the deposit account (the first account) of the user of the cellular phone 101, or the deposit account (the second account) of the shop, to the deposit account of a manager of the settlement server 117-1.

After the above process is completed, the controller 403 of the payer bank server 117-2 operates to send a settlement completion signal, which includes the transaction identification data, to the settlement server 117-1.

In addition, the settlement server 117-1 may directly send a transfer request signal to the contractor bank server 117-3 to perform the transfer mentioned above without passing through the payer bank server 117-2. When the contractor bank server 117-3 receives the transfer request signal, the controller 405 transfers the requested charge to the deposit account of the shop. It is preferable that the transfer request signal include the identification data of the shop, the requested amount of money, and identification data of the cellular phone 101.

When the settlement server 117-1 receives the settlement completion signal, the controller 401 directs the writing of data to the memory 402 to set the settlement completion flag to one. When the settlement completion flag is set, it is preferable that the time (or the date as well) be stored in correspondence with the settlement completion flag.

<5.3 Settlement Report>

When the settlement completion flag is set to one, the controller 401 of the settlement server 117-1 uses the identification data of the cellular phone 101 as an address, or the controller 401 reads from the memory 402 an email address of the cellular phone 101, which is stored in correspondence with the identification data of the cellular phone 101 and uses the email address as an address, and sends an email containing a settlement report to the cellular phone 101 through the Internet 104-5, the gateway 104-4, the mobile switching center 104-3, the base station controller 104-2, and the base station 104-1. For example, the settlement report includes the transaction identification data (here, it is 003), the identification data P of the cash register 118, and data of the list of the purchased items (described as ZZZZZZ here), and the amount of the money transferred from the deposit account of the user to the account of the shop.

The controller 202 of the cellular phone 101 receives the settlement report by the radio transmitter and receiver 201, and stores the content of the settlement report and the time of receiving the report in the memory 203, and displays them on the display 205. At the same time, the controller 202 may also display, on the display 205, the data of the list of the purchased items, the transaction identification data (including the relevant recorded time information), and the identification data P of the cash register 118, which have been stored in the memory 203 already. Alternatively, the controller 202 compares the data of the list of the purchased items, the transaction identification data (including the relevant recorded time information), and the identification data P of the cash register 118 in the settlement report with those already stored in the memory 203, and only displays the differing parts in the received settlement report in a way the user can understand. For example, differing parts are shown in red, and the others are in black.

The user of the cellular phone 101 observes the information on the display 205, and from the information on the display 205, the user is able to determine whether the settlement is appropriately made. For example, the controller 202 may display a message like "Is the settlement OK?" on the display 205 to request the user of the cellular phone 101 to acknowledge the settlement, and in response to that, the user may operate the input unit 206 to show agreement. Then the controller 202 controls the radio transmitter and receiver 201 to transmit a settlement report acknowledgement signal including the identification data of the cellular phone 101 and the transaction identification data to the settlement server 117-1 via the base station 104-1 and others. In addition, the controller 202 also stores the time of the operation of showing agreement in the memory 203 as the time of settlement report acknowledgement.

The settlement server 117-1 receives the settlement report acknowledgement signal via the Internet 104-5, the gateway 104-4, the mobile switching center 104-3, the base station controller 104-2, and the base station 104-1, and sets the settlement acknowledgement flag to one if the received identification information of the cellular phone 101 and the transaction identification data are in agreement with those stored in the memory 402. Preferably, the time of receiving the settlement acknowledgement signal is also stored in the memory 402 in response to the settlement acknowledgement flag.

On the other hand, if there is a discrepancy in the charge, and the user of the cellular phone 101 operates the input unit 206 to refuse acknowledgement of the settlement, the controller 202 of the cellular phone 101 controls the radio transmitter and receiver 201 to transmit a settlement report refusal signal to the settlement server 117-1. The controller 401 of the settlement server 117-1 receives the settlement report refusal signal, and outputs the identification data of the cellular phone 101 and the transaction identification data to a not illustrated printer or a display, and outputs a signal indicating the refusal of acknowledgement of the settlement by the user. Upon receiving the refusal signal, the manager of the settlement server 117-1 may check the details of the transaction and find any problems. As described above, the manager of the settlement server 117-1 may send the identification data or the secret information of the cellular phone 101 to the security service center.

In the embodiment described above, it is preferable that the controller 401 of the settlement server 117-1 be adapted to detect any abnormality with reference to the time of reception, the flag of settlement completion, and the flag of settlement acknowledgement stored in the memory 402, and output the identification data of the cash register 118 and the transaction identification data of the transaction with abnormality to a not illustrated printer. As the method of detecting the abnormality, the following cases may be regarded as abnormal. For example, either the flag of settlement completion or the flag of settlement acknowledgement has not been set, yet, although presently a specified length of time has elapsed from the time of reception; or the flag of settlement acknowledgement has not been set, yet, although presently a specified length of time has elapsed from the time when the flag of settlement completion is set.

Further, in the cellular phone 101, when a specified length of time has elapsed so far from the time of receiving the settlement report, which is stored in the memory 203, the controller 202 may display on the display 205 the fact that the acknowledgement of the settlement report has not been made.

In the present embodiment, the settlement server 117-1 has a transmitter and a receiver for transmitting signals to or receiving signals from the cellular phone 101, and a transmitter and a receiver for transmitting signals to or receiving signals from the cash register 118, and the settlement server 117-1 communicates with the cellular phone 101 and the cash register 118 with the transmitters and receivers, although the detailed configurations of the transmitters and the receivers are not described.

Second Embodiment

The present embodiment relates to a modification to the step <3.3>, that is, the authentication in the purchase procedure as described in the first embodiment.

After the controller 207 of the cash register 118 stores the data of the list of the purchased items in the memory 208, the user of the cellular phone 101 or the store clerk operates the input unit 211 of the cash register 118 to input the identification data or the secret information of the cellular phone 101. The controller 207 of the cash register 118 transmits the identification data or the secret information of the cellular phone 101 to the cellular phone 101 using the local communication unit 209. When the controller 203 of the cellular phone 101 receives the identification data or the secret information of the cellular phone 101 using the local communication unit 204, the controller 203 compares the received data with the identification data or the secret information of the cellular phone 101 stored in the memory 203. If they are in agreement, the controller 203 transfer a signal to the cash register 118 through the local communication unit 204 to indicate the agreement of the data. The controller 207 of the cash register 118 receives the signal with the local communication unit 209, then ends authenticating the cellular phone 101, and then concludes that the cellular phone 101 is valid. After that, the controller 207 transmits the purchased items to the cellular phone 101 and makes confirmation about the intent of purchase of the purchaser (the step 3.3 in the first embodiment), and other routines-subsequent to this.

If the controller 207 of the cash register 118 does not receive the signal for indicating the agreement of the data, the controller 207 may end the authentication of the cellular phone 101, as described in the step <3.3> in the first embodiment, or transmit the identification data or the secret information of the cellular phone 101 to the security service center, and the security service center does the same things as mentioned above.

Third Embodiment

With the previous embodiments, there exists a possibility that a person who illegally becomes aware of the identification data or the secret information of the cellular phone 101 operates the cash register 118 and makes illegal settlements.

In other words, the person who illegally becomes aware of the identification data or the secret information of the cellular phone 101 operates the input unit 211, inputs the data of the purchased items and the identification data or the secret information of the cellular phone 101, creates an illegal list of the purchased items, stores the data of the list in the memory 208 in correspondence with the identification data of the cellular phone 101, and further goes through the procedures subsequent to the settlement step (the step <5.2>) in the first embodiment, and makes illegal settlements.

In order to prevent the above problem, in the present embodiment, which is a modification to the first embodiment, even when it is determined that the purchaser is valid, additional routines as described below are executed before the settlement step (the step <5.2>). Below is a detailed explanation.

After the controller 401 of the settlement server 117-1 stores the data received from the cash register 118 in the memory 208, that is, the identification data or the secret information of the cellular phone 101, the identification data P of the cash register 118, time of receiving the data of the list of purchased items (preferably, including the transaction identification data) and the like, the controller 401 directs the waiting for reception of a settlement request report from the cellular phone 101. In other words, the controller 202 of the cellular phone 101, in response to operations of the input unit 206 by the user, displays the data of the list of the purchased items stored in the memory 203, the time of the settlement acknowledgement, the identification data of the cash register 118 and the like to the display 205. For example, if the user of the cellular phone 101 acknowledges the settlement according to the displayed information, the user makes specified operations on the input unit 206. Therefore, from the memory 203, the controller 202 of the cellular phone 101 reads out the data of the list of the purchased items, the time of the settlement acknowledgement, the identification data of the cash register 118, and the identification data or the secret information of the cellular phone 101 (preferably, including the transaction identification data), and transmits the settlement request signal to the settlement server 117-1 via the Internet 104-5, the gateway 104-4, the mobile switching center 104-3, the base station controller 104-2, and the base station 104-1.

The settlement server 117-1 receives the settlement request signal, and compares the data in this signal with those received from the cash register 118 and stored in the memory 402 to check agreement of them. Preferably, if the settlement server 117-1 determines that they are in perfect agreement, then the settlement step (the step <5.2> in the first embodiment) and the steps subsequent to this are executed, otherwise, the settlement step and the other steps are not executed.

In the present embodiment, when a specified length of time has elapsed from the time of the settlement request, preferably, the controller 202 of the cellular phone 101 displays a message on the display 205 prompting the user to perform the operation of transmitting the settlement request signal. In addition, if the operation of transmitting the settlement request signal has not been made even after a specified length of time has elapsed from the time of the settlement request, preferably, the controller 202 may control the cellular phone 101 so that the purchase procedure and the settlement routine are not performed.

Similarly, on the side of the settlement server 117-1, if the settlement request signal has not been received even after a specified length of time has elapsed from the time of receiving the data of the list of the purchased items transmitted from the cash register 118 and stored in the memory 402, preferably, the controller 401 controls the settlement server 117-1 so that settlements for the cellular phone, which cellular phone declares the same identification information as that of the cellular phone 101, will not be processed hereinafter.

Fourth Embodiment

In the third embodiment, because the settlement server 117-1 may not transfer money to a shop while the settlement server 117-1 is in the process of comparing the data in the settlement request signal and the data received from the cash register 118 and stored in the memory 402, and determining whether they are in agreement, if the user of the cellular phone 101 does not transmit the settlement request signal for a quite long time, the settlement will be delayed. Therefore, in the present embodiment, a modification is made to the first embodiment, and an additional routine is executed after the step of authentication (step <5.1>) in the first embodiment.

When the controller 401 of the settlement server 117-1 consequently determines that the cellular phone that acknowledges the settlement is the valid target of the settlement transaction, in correspondence with the identification data (here, they are "XXXXXX1") of the cellular phone 101, the controller 401 stores the transaction identification data (here, they are 001), the identification data P of the cash register 118, and the received data of the list of purchased items (simply described as XXXXXX in FIG. 6, but the same as that shown in FIG. 4 and FIG. 5) in the memory 402.

Then, the controller 401 of the settlement server 117-1 controls a not-illustrated transmitter to transmit to the buyer bank server 117-2 a shop settlement request signal including the identification data of the cellular phone 101, the identification data P of the cash register 118, and the requested charge in the data of the purchased goods list. The buyer bank server 117-2 receives the shop settlement request signal, and the controller 403 of the buyer bank server 117-2 extracts the identification data of the cellular phone 101, the identification data P of the cash register 118, and the requested charge included in the shop settlement request signal. Further, the controller 403 transfers an amount of money equaling to the requested charge from a specified account, information of which is stored in the memory 404, of the manager of the settlement server 117-1, to a deposit account of the shop corresponding to the identification data of the cash register 118.

After the above process is completed, the controller 403 of the payer bank server 117-2 operates to send a shop settlement completion signal, which includes the transaction identification data, to the settlement server 117-1.

When the settlement server 117-1 receives the shop settlement completion signal, the controller 401 directs the writing of data to the memory 402 to set the shop settlement completion flag to one. When the shop settlement completion flag is set, it is preferable that the time (or the date as well) be stored in correspondence with the shop settlement completion flag.

Then, the controller 401 of the settlement server 117-1 directs the waiting for reception of a settlement request report from the cellular phone 101.

In other words, the controller 202 of the cellular phone 101, in response to operations of the input unit 206 by the user, displays the data of the list of the purchased items stored in the memory 203, the time of the settlement acknowledgement, the identification data of the cash register 118 and the like on the display 205. For example, if the user of the cellular phone 101 acknowledges the settlement according to the displayed information, the user performs specified operations on the input unit 206. Therefore, from the memory 203, the controller 202 of the cellular phone 101 reads out the data of the list of the purchased items, the time of the settlement acknowledgement, the identification data of the cash register 118, and the identification data or the secret information of the cellular phone 101 (preferably, including the transaction identification data), and transmits the settlement request signal to the settlement server 117-1 via the Internet 104-5, the gateway 104-4, the mobile switching center 104-3, the base station controller 104-2, and the base station 104-1.

The settlement server 117-1 receives the settlement request signal, and compares the data in this signal with those received from the cash register 118 and stored in the memory 402 to check agreement of them. If the settlement server 117-1 determines that the data in comparison are in perfect agreement, the controller 401 of the settlement server 117-1 controls a not-illustrated transmitter to transmit to the buyer bank server 117-2 a contractor settlement request signal including the identification data of the cellular phone 101, and the requested charge in the data of the purchased goods list stored in the memory 402. The buyer bank server 117-2 receives the contractor settlement request signal, and the controller 403 of the buyer bank server 117-2 extracts the identification data of the cellular phone 101 and the requested charge included in the contractor settlement request signal. Further, the controller 403 requests the contractor bank server 117-3 to transfer an amount of money equaling the requested charge from a deposit account, whose information is stored in the memory 404 in correspondence with the identification data of the cellular phone 101, of the user of the cellular phone 101, to a deposit account, whose information is stored in the memory 404 of the buyer bank server 117-4, of the manager of the settlement server 117-1.

After the above process is completed, the controller 403 of the payer bank server 117-2 operates to send a contractor settlement completion signal including the transaction identification data to the settlement server 117-1.

When the controller 401 of the settlement server 117-1 receives the contractor settlement completion signal, the controller 401 controls to write data to the memory 402 to set the contractor settlement completion flag to one. When the contractor settlement completion flag is set to one, it is preferable that the time (or the date as well) be stored in correspondence with the contractor settlement completion flag.

Then, if both of the shop settlement completion flag and the contractor settlement completion flag are set to one, the controller 401 sets the corresponding settlement completion flag to one.

In FIG. 6, although it is not illustrated how the shop settlement completion flag and the contractor settlement completion flag are stored in the memory 402, as an example, they may be stored corresponding to each transaction.

Fifth Embodiment

The present embodiment is a modification to the first embodiment, wherein the order of the step of creating the list of the purchased items (step <3.1>) and the step of forming the local path (step <3.2>) is changed.

The user of the cellular phone 101 informs the store clerk of the identification data of the cellular phone 101, and the store clerk operates the input unit 211 of the cash register 118, and inputs the identification data of the cellular phone 101. Alternatively, the user of the cellular phone 101 may operate the input unit 211 of the cash register 118 by himself to input the identification data of the cellular phone 101. When the identification data of the cellular phone 101 are input, the controller 207 stores the identification data in the memory 208 as an element of the list of the purchased items.

The cash register 118 uses the identification data of the cellular phone 101 to determine the cellular phone to be a target of communication made through the local communication unit 209. This is particularly useful when the Blue-Tooth technique is employed. Specifically, in that case, the local communication unit 209 transmits the identification data of the cellular phone 101 by radio signals. A cellular phone, for example, the cellular phone 101, which is adapted to receive the radio signals, receives the radio signals by using its local communication unit 204, and compares the received identification data with its own identification data stored in the memory 203. When they are in agreement, the cellular phone 101 starts transmission and reception of radio signals with the cash register 118; when they are not in agreement, the cellular phone 101 does not perform the subsequent authentication and other processing even if the cellular phone 101 receives the radio signals.

The cash register 118 uses this identification data of the cellular phone 101 to determine the cellular phone as a target of communication made through the local communication unit 209. When the local communication unit 204 and the local communication unit 209 communicate with each other by a cable, transmission of the identification data of the cellular phone 101 may be omitted if there is only one target cellular phone that is connected with the cash register 118 and communicates with the cash register 118 by a cable.

As described above, a communication path is formed between the local communication unit 204 and the local communication unit 209. In addition, it is preferable that the communication using this path be encrypted, and the controller 207 and the controller 202 be capable of encryption processing of communication.

Then, the store clerk inputs to the cash register 118 the information of the goods desired by the user, which is obtainable from the identification information of the goods on sale. Alternatively, the store clerk may use a bar code reader to read the bar code printed on each item of goods, and the bar code data are sent to the controller 207. In this case, the bar code data may include the identification information of the goods on sale, and the bar code reader corresponds to the input unit 211.

Next, the controller 207 reads the price data corresponding to the information of the purchased goods input from the input unit 211 (the identification information of the goods on sale) from the memory 208, and calculates the sum of prices of the purchased goods.

The controller 207 of the cash register 118 reads out the prices corresponding to the information of the items to be purchased, which is input from the input unit 211. For example, the identification information items 0001 and 0002 are input as the data of the items to be purchased, and the prices 1000 Yen and 500 Yen corresponding to the identification information items 0001 and 0002 are read out by the controller 207. Then, the controller 207 calculates the sum (1500 Yen) of the prices of the two items, and further multiplies the sum by 1.05 to include the consumption tax. Therefore, the charge that the purchaser is requested to pay is 1575 Yen, and this value is displayed on the display 210. Preferably, the names of the purchased items are also displayed. Then, the controller 207 stores the information of the purchased items in the memory 208 in correspondence with the identification data of the cellular phone 101.

The subsequent processing is the same as that described in the first embodiment.

While the invention has been described with reference to preferred embodiments, the invention is not limited to these embodiments, but numerous modifications could be made thereto without departing from the basic concept and scope described in the claims.

INDUSTRY APPLICABILITY

According to the present invention, it is possible to provide an electronic money settlement method using a mobile communication terminal enabling a purchaser to confirm, from his mobile terminal at any desired time and any desired place and in near-real time, whether the payment is made safely for the exact goods he ordered or the exact service he requested. In addition, it is possible to provide an electronic money settlement method using a mobile communication terminal enabling detection of misuse of the purchaser's data if the purchaser's data are misused.

On the other hand, it is possible to provide an electronic money settlement method using a mobile communication terminal enabling safe authentication of the purchaser in a short time interval at shops, thus enabling safe charging at shops in a short time interval.

Furthermore, it is possible to provide an electronic money settlement method using a mobile communication terminal enabling safe data exchange because authentication and encryption are performed in data communication between the mobile communication terminal and the cash register and the settlement server.

The invention claimed:

1. A settlement system, comprising:
    a mobile communication terminal connectable with a mobile communication network;
    an input device configured to receive input data of items or a service to be purchased and identification data of the mobile communication terminal and output data of a charge based on the input data of the items or the service to be purchased; and
    a settlement device able to communicate with the mobile communication terminal through the mobile communication network and able to communicate with the input device through the mobile communication network, and able to transfer money from a first account to a second account,
    wherein
    the input device comprises:
    a first transmission unit configured to transmit the data of the charge to the mobile communication terminal; and
    a second transmission unit configured to transmit the data of the charge, the identification data of the mobile communication terminal, and identification data of the input device to the settlement device;
    the settlement device comprises:
    a control unit configured to transfer an amount of money determined by the data of the charge from the first account determined by the identification data of the mobile communication terminal received from the input device to the second account determined by the identification data of the input device; and
    a transmission unit configured to transmit report data of the amount of money to the mobile communication terminal through the mobile communication network; and
    the mobile communication terminal comprises:
    a first reception unit configured to receive the data of the charge from the input device;
    a second reception unit configured to receive the report data of the amount of money from the settlement device;
    a display configured to display the data of the charge and the report data of the amount of money;
    a memory configured to be able to store the data of the charge from the input device at least until the report data is received by the second reception unit; and
    a transmission unit configured to transmit an acknowledgement signal acknowledging the received report data to the settlement device.

2. A mobile communication terminal connectable with a mobile communication network and able to communicate with an input device for outputting data of a charge based on input data of items or a service to be purchased and a settlement device able to transfer money from a first account to a second account through the mobile communication network in response to receiving the data of the charge from the input device, the mobile communication terminal comprising:
    a first reception unit configured to receive the data of the charge from the input device;
    a second reception unit configured to receive report data of an amount of money from the settlement device through the mobile communication network;
    a display configured to display the data of the charge and the data of the amount of money;
    a memory configured to be able to store the data of the charge from the input device at least until the report data is received by the second reception unit; and
    a transmission unit configured to transmit an acknowledgement signal acknowledging the received report data to the settlement device.

3. The settlement system as claimed in claim 1, wherein the mobile communication terminal includes a control unit configured to compare the data of the charge from the input device and the report data from the settlement device, and control the display to display differing data between the data of the charge and the report data.

4. The mobile communication terminal as claimed in claim 2, further comprising:
    a control unit configured to compare the data of the charge from the input device and the report data from the settlement device, and control the display to display differing data between the data of the charge and the report data.

* * * * *